(12) United States Patent
Bilionis et al.

(10) Patent No.: US 12,465,177 B2
(45) Date of Patent: Nov. 11, 2025

(54) ADJUSTMENT ASSEMBLY FOR A COUNTERTOP APPLIANCE

(71) Applicant: WHIRLPOOL CORPORATION, Benton Harbor, MI (US)

(72) Inventors: Peter I. Bilionis, St. Joseph, MI (US); Kapil Gupta, Pune (IN); Akshay Sanjay Tondwal, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/756,536

(22) Filed: Jun. 27, 2024

(65) Prior Publication Data

US 2024/0341532 A1    Oct. 17, 2024

Related U.S. Application Data

(62) Division of application No. 17/336,728, filed on Jun. 2, 2021, now Pat. No. 12,035,847.

(51) Int. Cl.
*A47J 43/07*    (2006.01)

(52) U.S. Cl.
CPC ................ *A47J 43/0705* (2013.01)

(58) Field of Classification Search
CPC ..... A47J 43/044; A47J 43/0705; A47J 43/082
See application file for complete search history.

(56) References Cited

U.S. PATENT DOCUMENTS

| | | | |
|---|---|---|---|
| 2,765,676 A | 10/1956 | Polivka et al. | |
| 3,299,226 A | 1/1967 | Edwards | |
| 3,555,212 A | 1/1971 | Cherry et al. | |
| 3,924,169 A | 12/1975 | Craft et al. | |
| 4,035,594 A | 7/1977 | McKinney et al. | |
| 4,505,324 A | 3/1985 | Hildebrand et al. | |
| 4,592,144 A | 6/1986 | Tolbert et al. | |
| 5,977,499 A * | 11/1999 | Black | H01H 15/005 200/16 D |
| 6,079,865 A | 6/2000 | Plavcan et al. | |
| 6,585,403 B2 | 7/2003 | Krall et al. | |
| 6,802,637 B2 | 10/2004 | Juriga et al. | |
| 6,966,690 B2 * | 11/2005 | Yen | A47J 43/0761 366/601 |
| 7,467,570 B2 | 12/2008 | Wang | |

* cited by examiner

*Primary Examiner* — Elizabeth Insler
(74) *Attorney, Agent, or Firm* — Price Heneveld LLP

(57) ABSTRACT

A countertop appliance includes a body with a pedestal and a mixer head that is operably coupled to the body and defines a slot. An adjustment assembly is operably coupled to and selectively disposed within the mixer head. The adjustment assembly includes an actuation feature that defines detents and includes an actuator with a first engagement member and a second engagement member. A slider that includes a knob extends outwardly from the slot defined by the mixer head. The knob is selectively coupled to the actuation feature. A barrier member is operably coupled to the slider proximate to the slot defined by the mixer head and the actuation feature.

19 Claims, 11 Drawing Sheets

ADJUSTMENT ASSEMBLY FOR A COUNTERTOP APPLIANCE

CROSS-REFERENCE TO RELATED APPLICATION

This application is a division of U.S. patent application Ser. No. 17/336,728, filed on Jun. 2, 2021, now U.S. Pat. No. 12,035,847, entitled "ADJUSTMENT ASSEMBLY FOR A COUNTERTOP APPLIANCE," the disclosure of which is hereby incorporated herein by reference in its entirety.

BACKGROUND OF THE DISCLOSURE

The present disclosure generally relates to a countertop appliance, and more specifically, to an adjustment assembly for a countertop appliance.

SUMMARY OF THE DISCLOSURE

According to one aspect of the present disclosure, a countertop appliance includes a body with a pedestal and a mixer head that is operably coupled to the body and defines a slot. An adjustment assembly is operably coupled to and selectively disposed within the mixer head. The adjustment assembly includes an actuation feature that defines detents and includes an actuator with a first engagement member and a second engagement member. A slider that includes a knob extends outwardly from the slot defined by the mixer head. The knob is selectively coupled to the actuation feature. A barrier member is operably coupled to the slider proximate to the slot defined by the mixer head and the actuation feature.

According to another aspect of the present disclosure, a countertop appliance includes a mixer head and an adjustment assembly that is operably coupled to and selectively disposed within the mixer head. The adjustment assembly includes an actuation feature that defines detents and includes an actuator. A slider includes a knob that extends outwardly from a slot defined by the mixer head. The knob is selectively coupled to the actuation feature. The slider defines a groove and a notch within the groove. A barrier member is operably coupled to the slider proximate to the slot defined by the mixer head and the actuation feature. The barrier member includes a spine that has a projection selectively coupled with the notch defined by the slider.

These and other features, advantages, and objects of the present disclosure will be further understood and appreciated by those skilled in the art by reference to the following specification, claims, and appended drawings.

Figure 1:
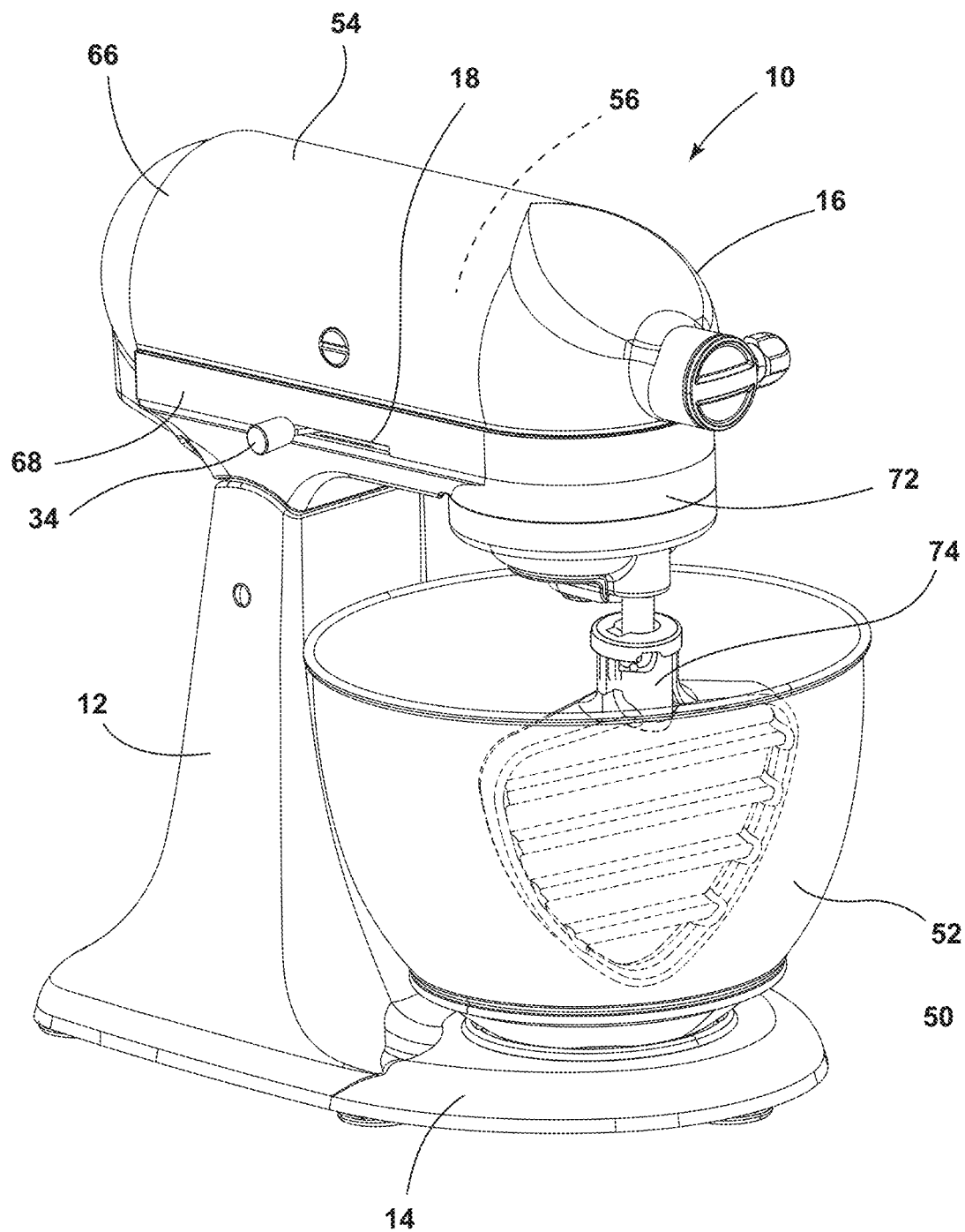
FIG. 1 is a front perspective view of a countertop appliance of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an adjustment assembly for a countertop appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-16, reference numeral 10 generally designates a countertop appliance 10 that includes a body 12 having a pedestal 14. A mixer head 16 is operably coupled to the body 12 and defines a slot 18. An adjustment assembly 20 is operably coupled to and selectively disposed within the mixer head 16. The adjustment assembly 20 includes an actuation feature 22 that defines detents 24 and includes an actuator 26. The actuator 26 includes a first engagement member 28 and a second engagement member 30. The adjustment assembly 20 also includes a slider 32 including a knob 34 that extends outwardly from the slot 18 defined by the mixer head 16. The knob 34 is selectively coupled to the actuation feature 22. The adjustment assembly 20 also includes a barrier member 36 that is operably coupled to the slider 32 proximate to the slot 18 defined by the mixer head 16 and the actuation feature 22.

Referring now to FIGS. 1-4, the countertop appliance 10 is illustrated as a stand mixer. It is also contemplated that the adjustment assembly 20 described herein may be utilized with various countertop appliances 10 including, but not limited to, blenders, food processors, stand mixers, or other countertop appliances generally known in the art. As mentioned above, the countertop appliance 10 includes the body 12 with the pedestal 14. The body 12 is coupled to the mixer head 16. The body 12 may be generally stationary while the mixer head 16 may be pivotably coupled to the body 12. The pedestal 14 of the body 12 defines an attachment feature 50 to which a mixing container 52 may be operably coupled. As depicted in FIG. 1, the mixing container 52 is illustrated as a mixing bowl. It is also contemplated that the mixing container 52 may include other containers, such as a jar, a bowl, or other practicable containers contemplated for use with a countertop appliance 10.

Figure 2:
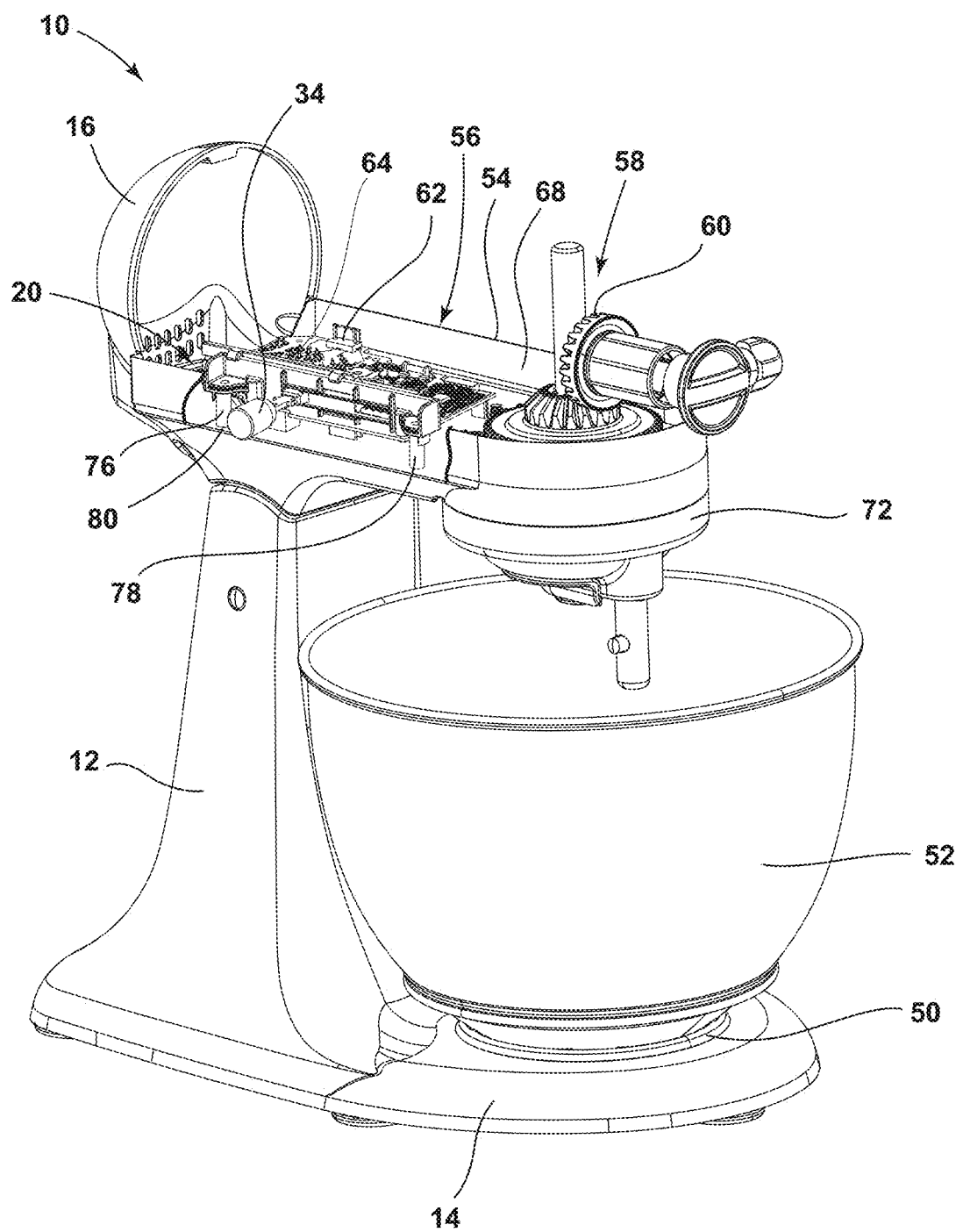
FIG. 2 is a front perspective view of a countertop appliance of the present disclosure with an upper shell of a mixer head removed and with an adjustment assembly of the present disclosure.
Figure 3:
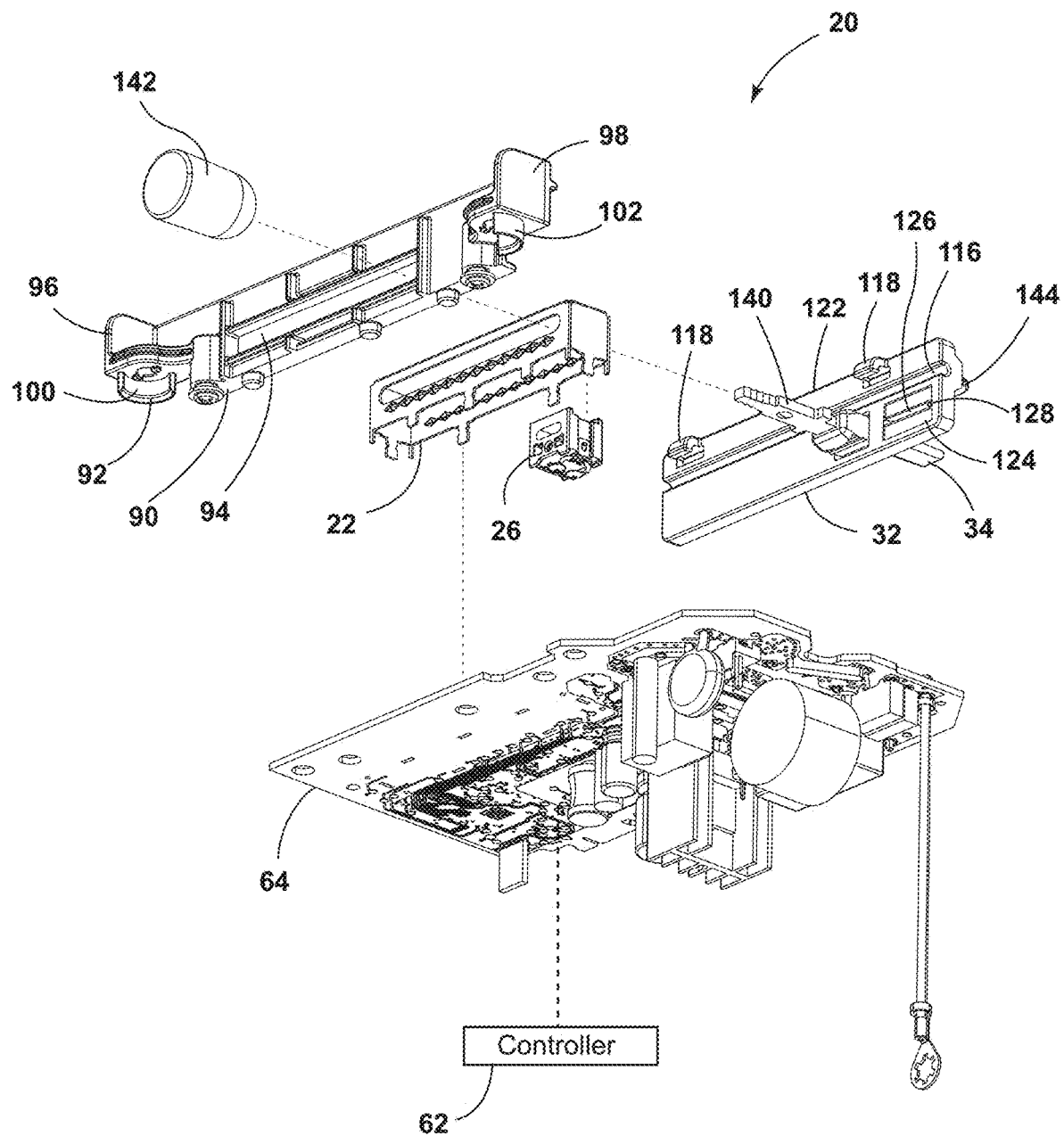
FIG. 3 is an exploded view of an adjustment assembly of the present disclosure.
Figure 4:
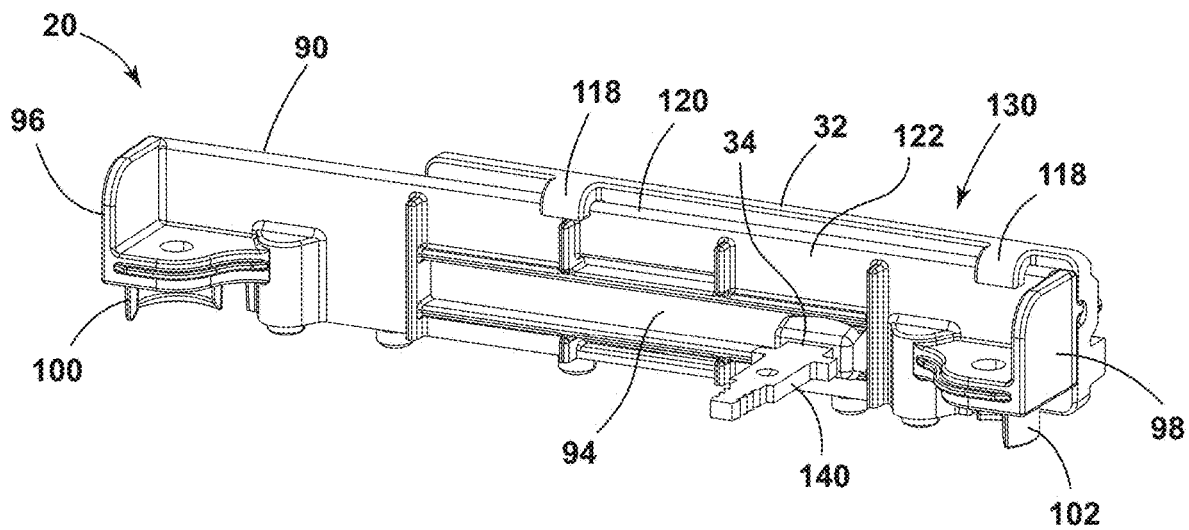
FIG. 4 is a top perspective view of a slider of the present disclosure coupled to a bracket.
Figure 5:
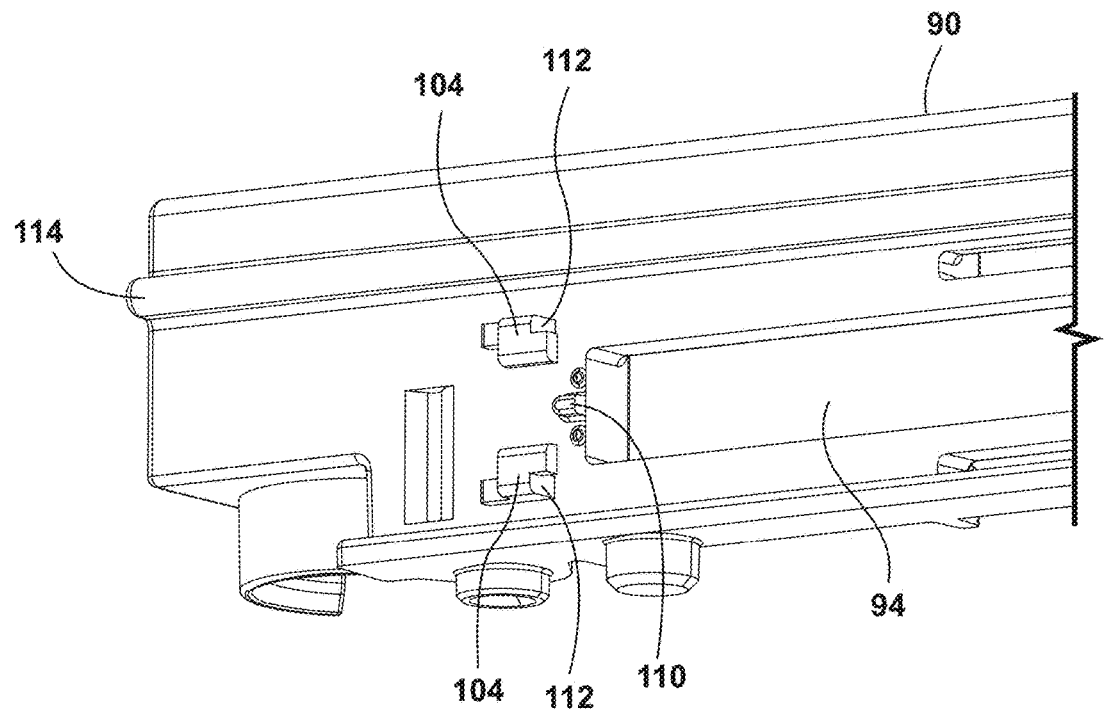
FIG. 5 is a partial enlarged rear perspective view of the bracket of FIG. 4 with retention features and a protrusion proximate to an opening defined by the bracket.
Figure 6:
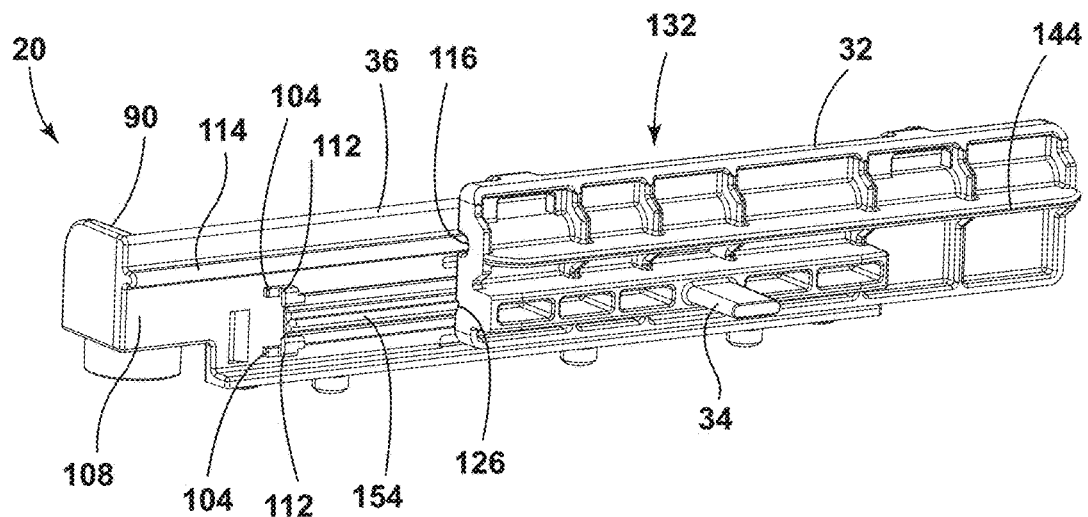
FIG. 6 is a rear perspective view of a bracket, a slider, and a barrier member of the present disclosure.
Figure 7:
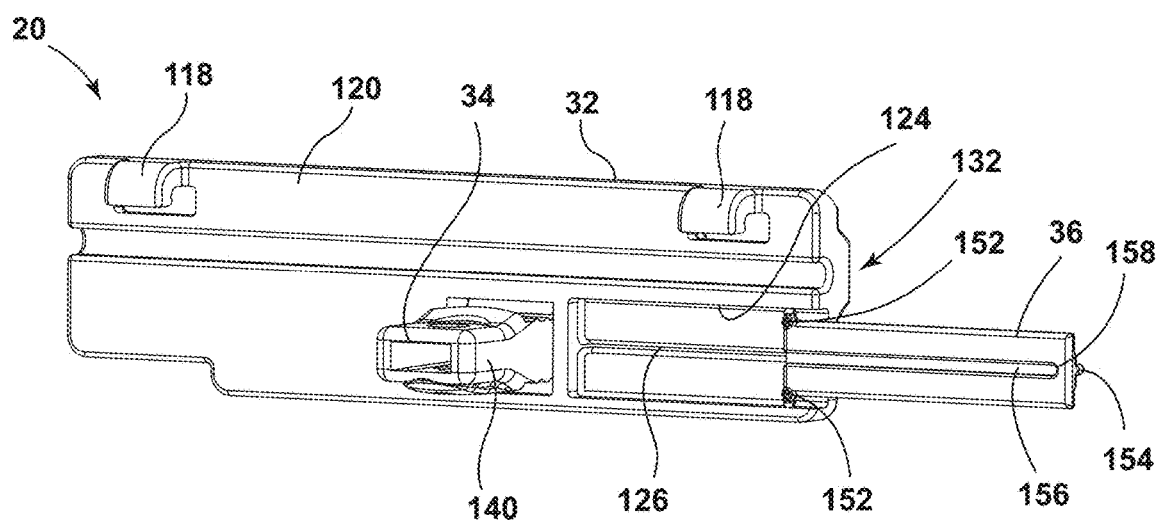
FIG. 7 is a front perspective view of a slider and a barrier member of the present disclosure.
Figure 8:
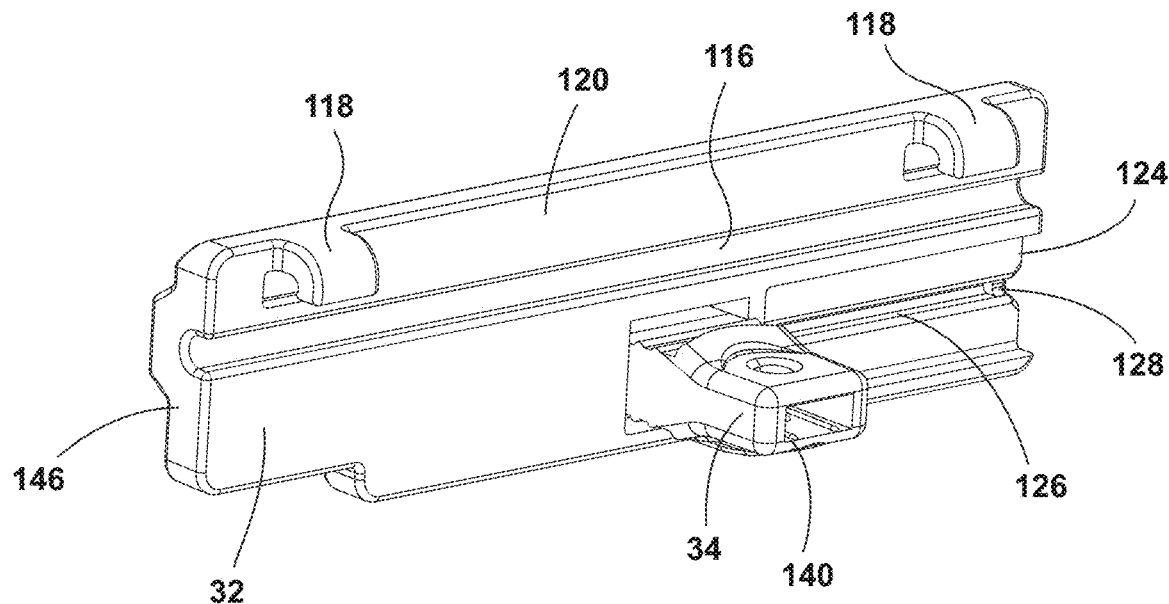
FIG. 8 is a side perspective view of a slider of the present disclosure.
Figure 9:
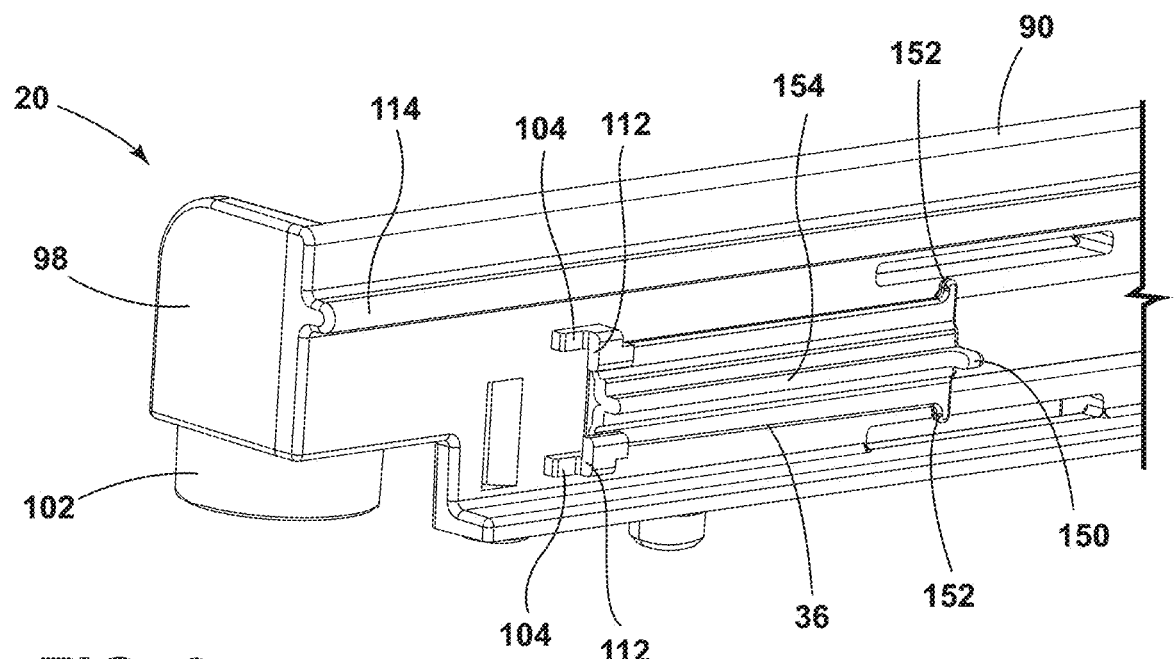
FIG. 9 is a partial enlarged rear perspective view of a bracket and a barrier member of the present disclosure.

As mentioned above, the mixer head 16 is operably coupled with the body 12 of the countertop appliance 10, such that the mixer head 16 may pivot between a raised position and a lowered position relative to the body 12. It is also contemplated that the mixer head 16 may be operably coupled to the body 12 and remain stationary relative to the body 12. The mixer head 16 includes a shell 54 that defines the slot 18 mentioned above. The shell 54 is selectively removable relative to the mixer head 16 to provide access to a mechanical compartment 56 of the countertop appliance 10. For example, the shell 54 may be removed to perform routine maintenance within the mechanical compartment 56. As described further below, the mechanical compartment 56 generally contains the adjustment assembly 20 and other mechanical components 58 of the countertop appliance 10. For example, as illustrated in FIG. 2, the mechanical components 58 may include, but is not limited to, gears 60, a controller 62, and a printed circuit board 64. It is generally contemplated that the mechanical components 58 are communicatively coupled with one another to, at least in part, execute operations of the countertop appliance 10. For example, the printed circuit board 64 is configured to couple the controller 62 with the adjustment assembly 20, which ultimately adjusts the gears 60 within the mechanical compartment 56. It is generally contemplated that the controller 62 includes the printed circuit board 64 that is operably coupled to the actuator 26 via at least the first and second engagement members 28, 30, described in more detail below.

Referring now to FIGS. 1-5, the shell 54 of the mixer head 16 includes an upper shell 66 and a lower shell 68. The upper shell 66 may be selectively removable to provide access to the mechanical compartment 56, mentioned above. The lower shell 68 generally extends around a portion of the mixer head 16 proximate to the body 12 and an attachment portion 72 of the mixer head 16. The attachment portion 72 is configured to receive various attachments 74 of the countertop appliance 10, such that various food items and ingredients may be mixed or otherwise combined via interaction with the attachments 74. It is generally contemplated that the lower shell 68 is fixedly attached to the mixer head 16, whereas the upper shell 66 may be selectively removed from the lower shell 68 for potential maintenance of the mechanical components 58.

As illustrated in FIG. 1, the lower shell 68 defines the slot 18 of the mixer head 16, such that the knob 34 of the adjustment assembly 20 can extend outwardly from the slot 18 in the lower shell 68. The lower shell 68 of the mixer head 16 also includes at least one alignment feature 76 proximate to the slot 18. As illustrated, the at least one alignment feature 76 includes a first alignment feature 78 and a second alignment feature 80. It is also contemplated that greater than two alignment features 76 may be disposed on the lower shell 68 and/or fewer than two alignment features 76 may be disposed on the lower shell 68. The alignment features 76 are configured to align the adjustment assembly 20 relative to the slot 18 defined by the lower shell 68 within the mixer head 16. The first and second alignment features 78, 80 may each be configured as a box, a nub, or any other protruding feature generally practicable for assisting in proper alignment within the mixer head 16.

With further reference to FIGS. 2-5, the adjustment assembly 20 includes the actuation feature 22, the slider 32, the barrier member 36, and may also include a bracket 90, each discussed in further detail below. Additionally or alternative, the bracket 90 may be a separate feature from the adjustment assembly 20. The bracket 90 includes at least one flange 92 and an opening 94 configured to be aligned with the slot 18 defined by the shell 54 of the mixer head 16. It is generally contemplated that the at least one flange 92 may be disposed on a first end 96 and/or a second end 98 of the bracket 90. It is also contemplated that the at least one flange 92 may include a first flange 100 and a second flange 102. The first and second flanges 100, 102 may be generally arcuate in configuration and are configured to receive the first and second alignment features 78, 80. The at least one flange 92 may include more than two flanges 92 and/or less than two flanges 92. It is generally contemplated that the number of flanges 92 of the bracket 90 generally corresponds with the number of alignment features 76 defined by the mixer head 16.

Referring now to FIGS. 1 and 4-7, the bracket 90 is positioned within the mechanical compartment 56 and the first and second flanges 100, 102 can abut the first and second alignment features 78, 80. The first and second alignment features 78, 80 are configured to assist in the proper alignment of the bracket 90 within the mechanical compartment 56. The first and second flanges 100, 102 are illustrated as having a generally arcuate configuration, as mentioned above, which assists in cradling or otherwise wrapping around the first and second alignment features 78, 80. Stated differently, the first and second alignment features 78, 80 assist in proper alignment of the bracket 90 within the mechanical compartment 56, such that the opening 94 defined by the bracket 90 is aligned with the slot 18 defined by the mixer head 16.

Referring still to FIGS. 1 and 4-7, the bracket 90 also includes retention features 104 proximate to the opening 94. It is generally contemplated that the bracket 90 includes a first side 106 and a second side 108. For example, the at least one flange 92 of the bracket 90 may be disposed proximate the first side 106 of the bracket 90, and the retention features 104 may be disposed on the second side 108 of the bracket 90. The bracket 90 also includes a protrusion 110 outwardly extending from the second side 108 of the bracket 90. It is generally contemplated that the protrusion 110 may be disposed between the retention features 104 proximate to the opening 94. The retention features 104 can extend outwardly from the second side 108 of the bracket 90 and can each include an engagement ledge 112 with which the barrier member 36 may selectively engage.

It is generally contemplated that the engagement ledges 112 of the retention features 104 retain the barrier member 36 relative to the bracket 90, as described further below. It is further contemplated that the protrusion 110 of the bracket 90 also facilitates and generally retains the barrier member 36 relative to the opening 94 defined by the bracket 90. In addition to the engagement ledges 112 of each of the retention features 104, the bracket 90 also includes a retention ledge 114 outwardly extending from the second side 108 of the bracket 90. The retention ledge 114 is generally configured to retain the slider 32 on the bracket 90. For example, the slider 32 defines an alignment channel 116 in which the retention ledge 114 of the bracket 90 can be selectively disposed. It is contemplated that the slider 32 may translate along the bracket 90 with the retention ledge 114 being selectively disposed within the alignment channel 116 of the slider 32.

With further reference to FIGS. 1 and 4-7, the slider 32 may also include hooks 118 outwardly extending from an upper portion 120 of the slider 32. It is generally contemplated that the hooks 118 can extend over an upper edge 122 of the bracket 90. The hooks 118 of the slider 32 are configured to generally maintain alignment between the slider 32 and the bracket 90, such that as the slider 32 translates along the bracket 90. The hooks 118 assists in retaining the slider 32, as the slider 32 translates between a plurality of positions, described below.

The slider 32 also includes an adjustment portion 124 proximate to at least one end of the slider 32. The adjustment portion 124 of the slider 32 defines a groove 126 and a notch 128 defined within the groove 126. It is generally contemplated that the adjustment portion 124 of the slider 32 may be defined proximate to the knob 34 extending from the slider 32. The adjustment portion 124 of the slider 32 is configured to selectively receive the barrier member 36, such that the barrier member 36 may be selectively positioned between the bracket 90 and the slider 32 within the adjustment portion 124. It is further contemplated that the adjustment portion 124 of the slider 32 can be proximate to and may be at least partially visible through the opening 94 defined by the bracket 90. As mentioned above, the slider 32 is operable between a plurality of positions relative to the bracket 90. For example, the slider 32 may be positioned in a first position 130 and translate into a plurality of second positions 132, described below.

Referring still to FIGS. 1 and 4-7 and as generally mentioned above, the slider 32 includes the knob 34, which outwardly extends from the slider 32 and is configured to extend through the opening 94 of the bracket 90. It is generally contemplated that the knob 34 is operable between the first position 130 of the slider 32 and each of the plurality of second positions 132. It is also contemplated that the knob 34 may be proximate to and/or adjacent the barrier member 36 when the slider 32 is in the first position 130. As described in more detail below, the knob 34 also includes an engagement portion 138 extending away from the bracket 90 proximate to the actuator 26. The knob 34 also includes a shaft 140 and a handle 142. It is generally contemplated that the shaft 140 outwardly extends from the opening 94 defined by the bracket 90. In addition, the slider 32 includes a ledge 144 extending from a body portion 146 of the slider 32. The ledge 144 extends toward the actuation feature 22, described below, and is configured to cooperate with the barrier member 36 to minimize entry of food particles into the mechanical compartment 56, described further below. The engagement portion 138 of the knob 34 may be partially covered by the ledge 144 and may extend away from the body portion 146 of the slider 32. Stated differently, the engagement portion 138 of the knob 34 extends toward the actuation feature 22, as described below.

It is also contemplated that the shaft 140 may at least partially extend from the slot 18 defined by the shell 54 of the mixer head 16. Additionally or alternatively, the shaft 140 may extend through the opening 94 and the handle 142 may extend through the slot 18 to couple with the shaft 140. The handle 142 is assembled with the shaft 140 via heat melding, such that the handle 142 is positioned on the shaft 140 and heat is applied to shrink mold the handle 142 onto the shaft 140. The heat melding of the handle 142 with the shaft 140 assists in the retention of the handle 142 on the shaft 140, such that the overall useful life of the knob 34 may be extended. The handle 142 of the knob 34 is configured to assist the user in adjusting or otherwise modifying the action of the countertop appliance 10. For example, the user may translate the knob 34 via the handle 142 within both the opening 94 of the bracket 90 and the slot 18 defined by the mixer head 16 to adjust or modify, for example, the speed of the countertop appliance 10. The adjustment of the speed or other functions of the countertop appliance 10 via the knob 34 is described in more detail below with respect to the actuation feature 22.

Figure 10:
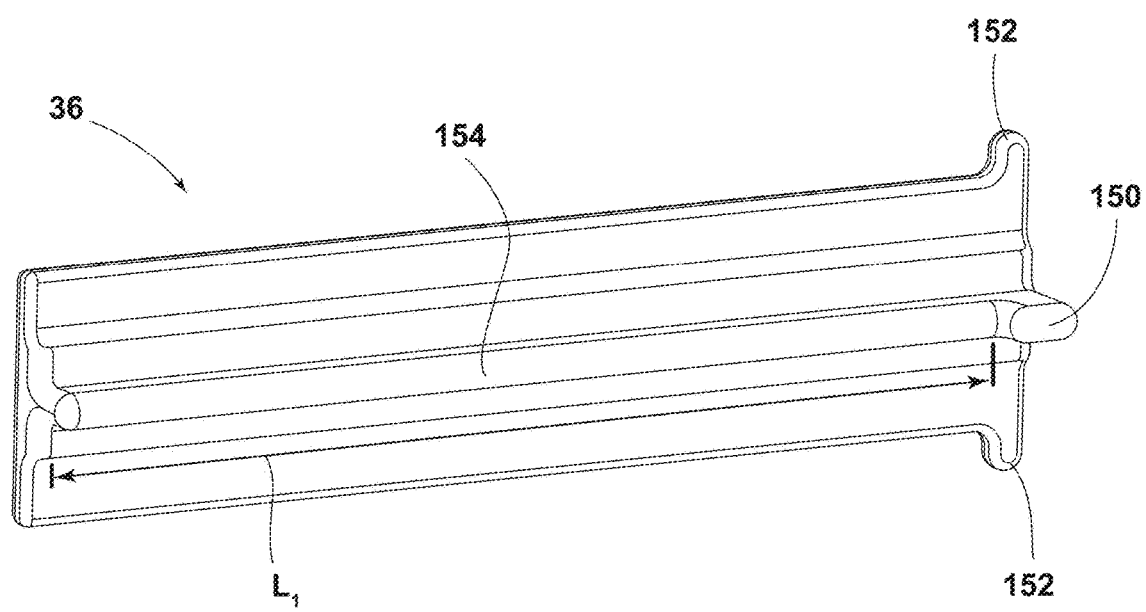
FIG. 10 is a side perspective view of a barrier member of the present disclosure with a spine, a projection, and retention tabs.
Figure 11:
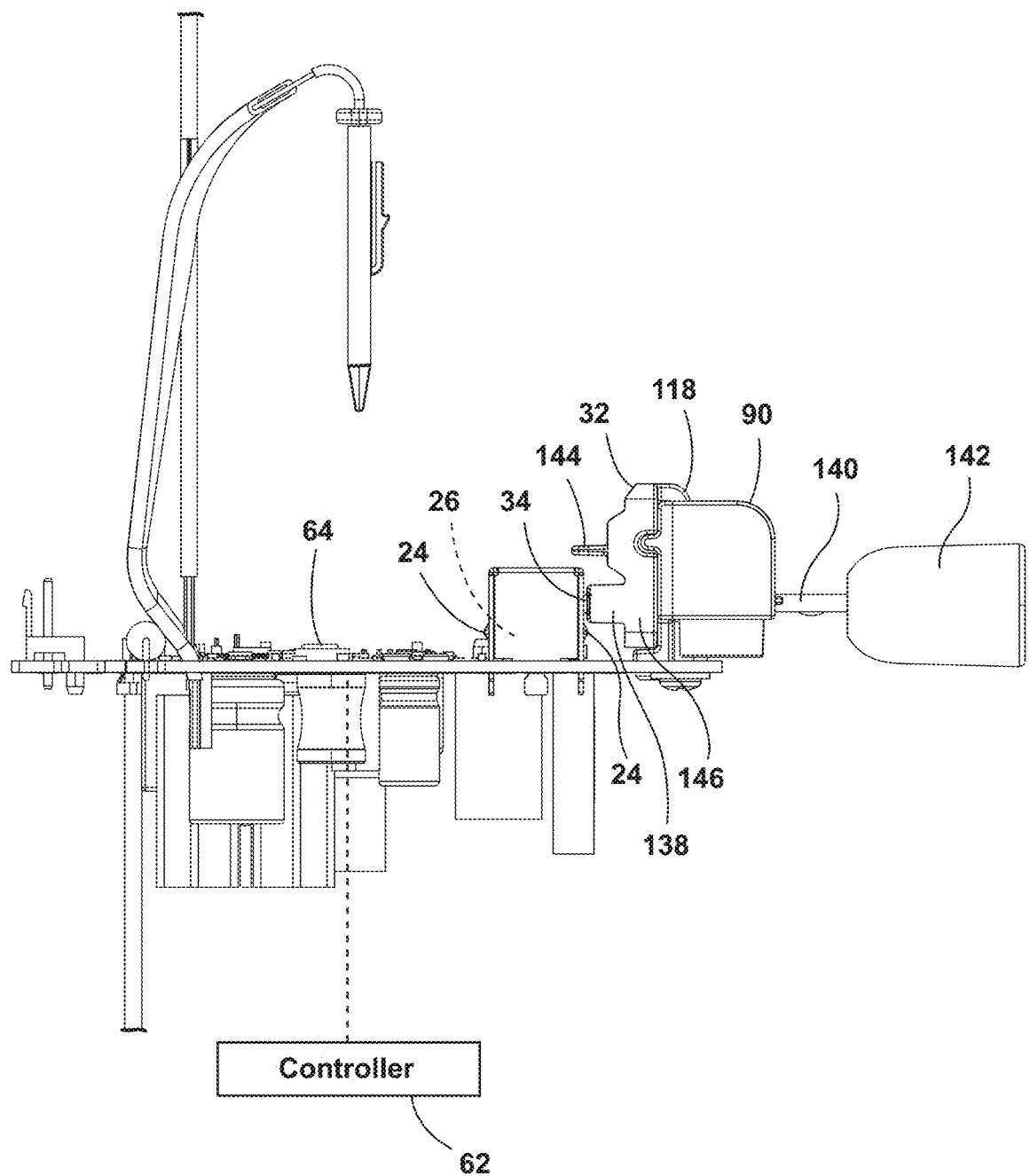
FIG. 11 is an enlarged side elevational view of an adjustment assembly of the present disclosure with a printed circuit board and a controller.
Figure 12:
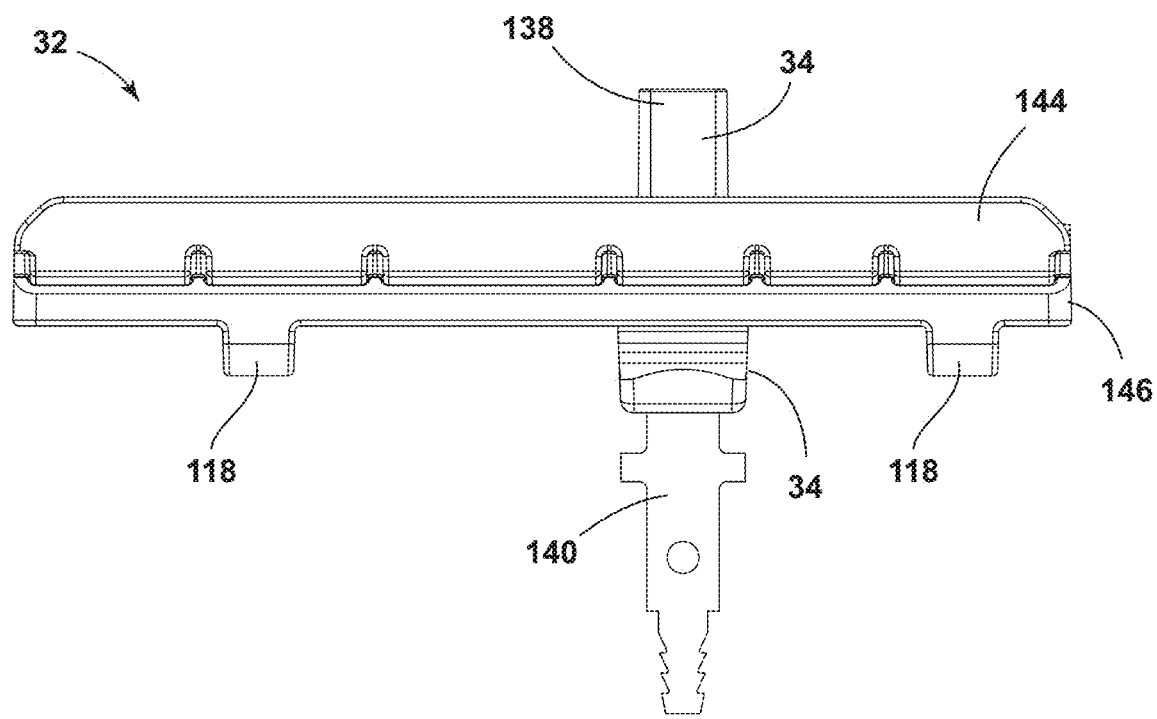
FIG. 12 is a top elevational view of a slider of the present disclosure.
Figure 13:
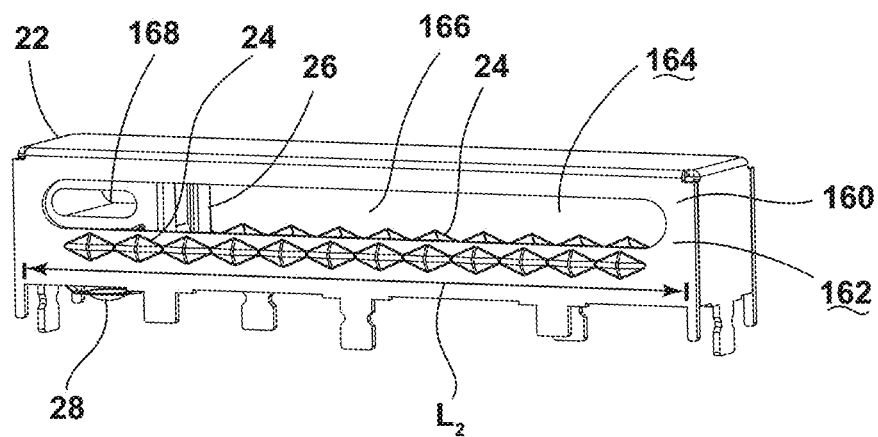
FIG. 13 is a side perspective view of an actuation feature of the present disclosure with an actuator.
Figure 14:
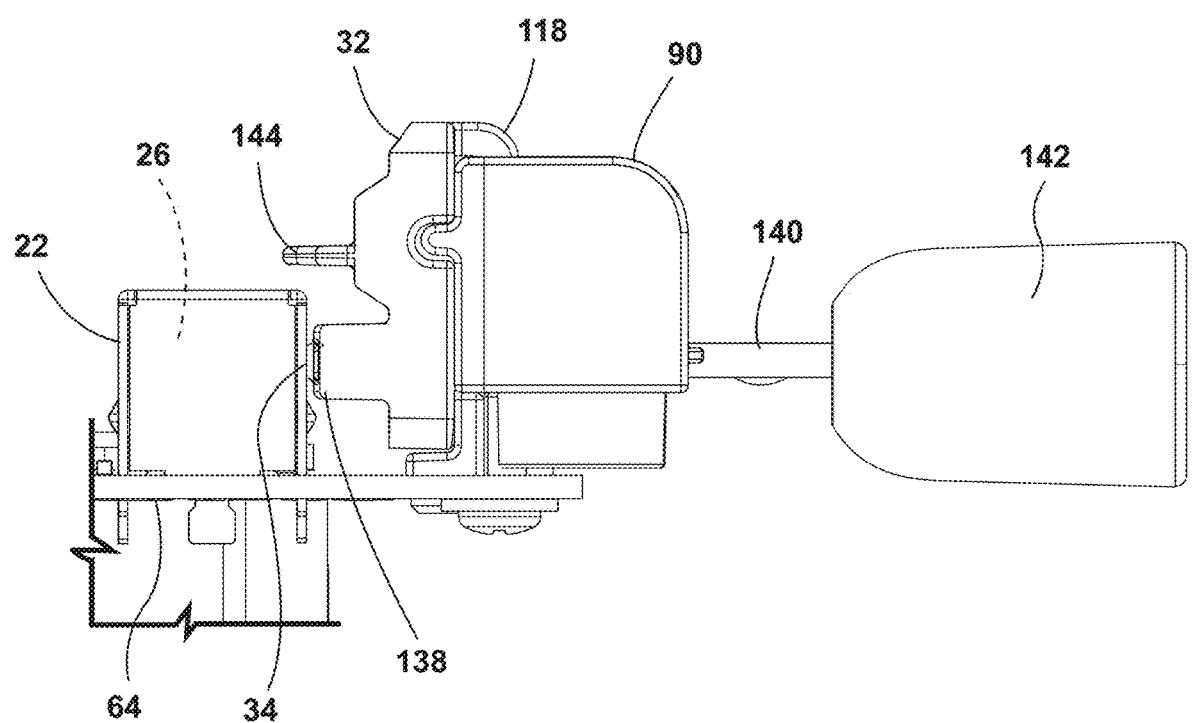
FIG. 14 is a partial enlarged side elevational view of an adjustment assembly of the present disclosure.

Referring now to FIGS. 6-10, the barrier member 36 includes a projection 150, retention tabs 152, a spine 154, and a channel 156 defined on an opposing side of the barrier member 36 from the spine 154. The spine 154 outwardly extends from the barrier member 36, such that the spine 154 extends toward the slider 32. The retention tabs 152 laterally extend from the barrier member 36. The projection 150 outwardly extends from both the barrier member 36 and the spine 154. Stated differently, the projection 150 extends outwardly from the spine 154 toward the slider 32. As depicted in FIG. 10, the projection 150 extends from the barrier member 36 greater than the spine 154. The spine 154 of the barrier member 36 may be disposed within the groove 126 defined by the slider 32, mentioned above. It is generally contemplated that the groove 126 is sufficiently deep to receive both the projection 150 and the spine 154 of the barrier member 36. For example, the notch 128 defined by the slider 32 is recessed within the groove 126, such that the spine 154 of the barrier member 36 may pass over the notch 128 while the projection 150 is configured to engage or be otherwise stopped by the notch 128 within the groove 126.

The notch 128 is configured to retain the barrier member 36 relative to the slider 32. Stated differently, the barrier member 36 is slidably and fixedly coupled with the slider 32, such that the barrier member 36 may slide within the adjustment portion 124 of the slider 32, while remaining fixed to the slider 32 via the engagement of the projection 150 and the notch 128. It is generally contemplated that the groove 126 of the slider 32 generally corresponds to a length $L_1$ of the spine 154 defined by the barrier member 36. It is also contemplated that when the slider 32 is in the first position 130, the barrier member 36 may extend past the slider 32 along the bracket 90. It is also contemplated that the barrier member 36 may be aligned with the slider 32 in the first position 130 and/or any one of the plurality of second positions 132.

With further reference to FIGS. 6-10, when the barrier member 36 extends past the slider 32 in the first position 130 of both the slider 32 and the barrier member 36, it is contemplated that the retention tabs 152 of the barrier member 36 may engage the engagement ledges 112 of the bracket 90. The retention tabs 152 of the barrier member 36 are configured to retain the barrier member 36 relative to the bracket 90 via the selective coupling with the retention features 104 of the bracket 90 via the engagement ledges 112. Further, the channel 156 defined by the barrier member 36 is configured to receive the protrusion 110 of the bracket 90 to further assist in the alignment and retention of the barrier member 36 with the bracket 90. For example, the protrusion 110 may engage an end 158 of the channel 156 in one of the plurality of second positions 132 of the barrier member 36. The retention tabs 152 and the projection 150 of the barrier member 36 are each configured to retain the barrier member 36 relative to each of the bracket 90 and the slider 32, respectively, as the slider 32 transitions from the first position 130 to any one of the plurality of second positions 132.

The barrier member 36 translates into at least one of the plurality of second positions 132 to conceal the opening 94 defined by the bracket 90. For example, the opening 94 defined by the bracket 90 is concealed by the slider 32 in the first position 130 of the slider 32 and is generally contemplated to be concealed by both the slider 32 and the barrier member 36 in any one of the plurality of second positions 132. The general alignment of the slider 32 and the barrier member 36 with the opening 94 is configured to minimize and generally prevent entry of food particles into the mechanical compartment 56 of the mixer head 16. Stated differently, the aligned slot 18 and opening 94 defined by the mixer head 16 and the bracket 90, respectively, are covered and concealed from the mechanical compartment 56 via the barrier member 36 and the slider 32. While the barrier member 36 blocks the opening 94, the ledge 144 of the slider 32 is also configured to block or otherwise obstruct the actuation feature 22. Stated differently, the barrier member 36 and the ledge 144 of the slider 32 are configured to minimize and generally prevent food particles from entering the actuation feature 22 via the slot 18, the opening 94, or areas surrounding the actuation feature 22.

With reference now to FIGS. 11-16, the engagement portion 138 of the knob 34 outwardly extends from the body portion 146 of the slider 32 past the ledge 144 defined by the slider 32 and is operably coupled with the actuation feature 22. As mentioned above, the actuation feature 22 includes a plurality of detents 24 defined along a length $L_2$ of a side 160 of the actuation feature 22. It is generally contemplated that the plurality of detents 24 are uniformly defined along the side 160 of the actuation feature 22, such that the detents 24 are configured to have similar size, shape, and configuration. The detents 24 can be defined along both a first side 162 and a second side 164 of the actuation feature 22, such that the detents 24 defined along the first side 162 correspond with the detents 24 defined along the second side 164 of the actuation feature 22.

The actuation feature 22 may be generally hollow, such that the actuator 26 can be disposed within and translate within the actuation feature 22. The actuation feature 22 also defines an elongated opening 166 proximate to the detents 24 on the first side 162 of the actuation feature 22. The actuator 26 defines a receiving aperture 168 that aligns with the elongated opening 166 defined by the actuation feature 22. It is generally contemplated that the engagement portion 138 of the knob 34 is configured to extend through both the elongated opening 166 of the actuation feature 22 and the receiving aperture 168 defined by the actuator 26. Stated differently, the engagement portion 138 of the knob 34 can be positioned within each of the elongated opening 166 and the receiving aperture 168 of the actuation feature 22 and the actuator 26, respectively, to translate and otherwise manipulate the actuator 26 within the actuation feature 22. The actuator 26 may engage any one of the plurality of detents 24 defined along the first and second side 162, 164 of the actuation feature 22 as the knob 34 translates the actuator 26 within the actuation feature 22.

Figure 15:
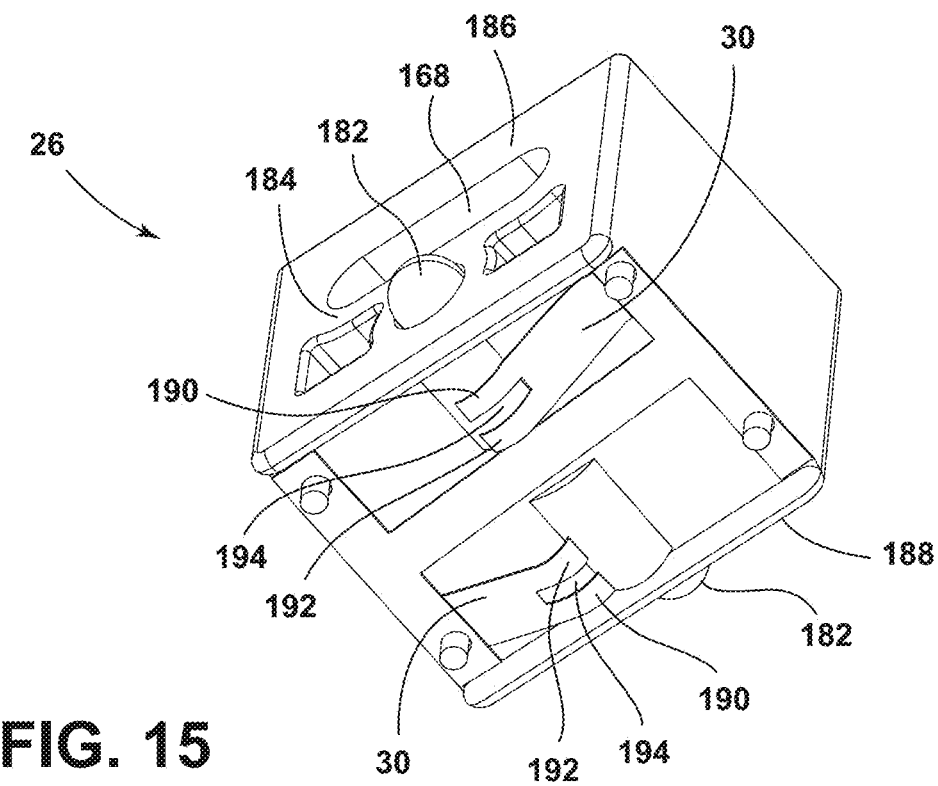
FIG. 15 is a bottom perspective view of an actuator of the present disclosure with first and second engagement features each including a first prong and a second prong.
Figure 16:
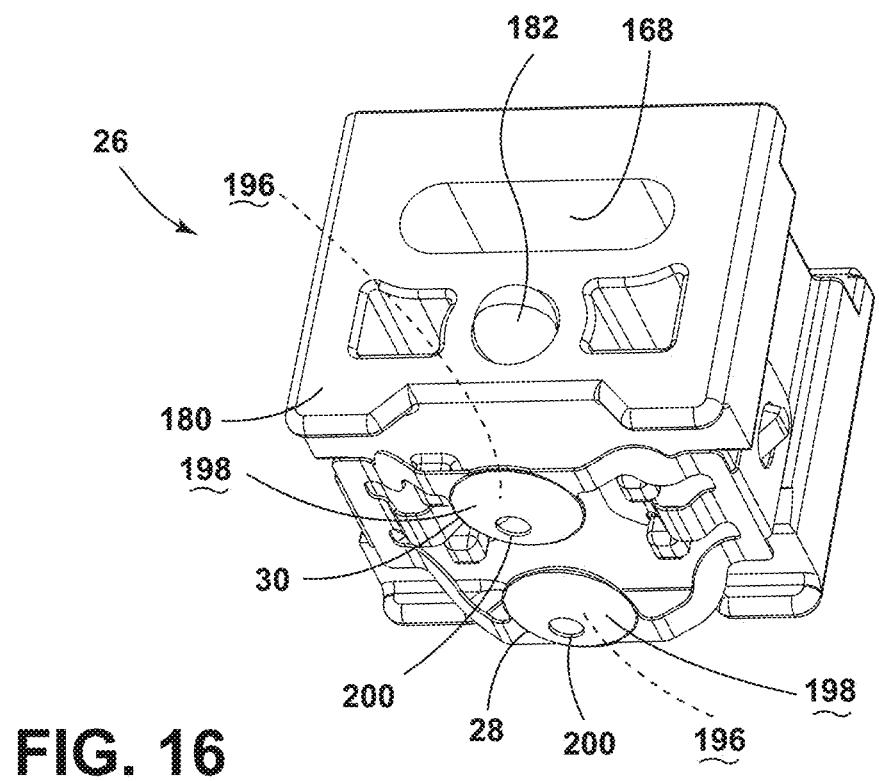
FIG. 16 is a bottom perspective view of an actuator of the present disclosure with first and second engagement features each having a circular configuration and an aperture.

With further reference to FIGS. 11-16, the actuator 26, as mentioned above, includes the first engagement member 28 and the second engagement member 30 operably coupled to a lower portion 180 of the actuator 26. The actuator 26 also includes a protuberance 182 outwardly extending from a side portion 184 of the actuator 26, which is configured to engage at least one of the detents 24. It is generally contemplated that the protuberance 182 may extend from a first side portion 186 and a second side portion 188 of the actuator 26, such that the protuberances 182 may engage and be operably coupled with the detents 24 defined along the first side 162 and the second side 164 of the actuation feature 22, respectively. As illustrated in FIGS. 15 and 16, the protuberance 182 is generally positioned beneath the receiving aperture 168 defined by the actuator 26 to generally align and correspond with the detents 24.

As illustrated in FIG. 15, the first and second engagement features 28, 30 of the actuator 26 each include a first prong 190 and a second prong 192. It is generally contemplated that the first and second prongs 190, 192 of each of the first and second engagement features 28, 30 define a gap 194 therebetween. The first and second prongs 190, 192 of are configured to engage and be communicatively coupled with the controller 62. Additionally or alternatively, and as illustrated in FIG. 16, it is also contemplated that the first engagement member 28 and the second engagement member 30 of the actuator 26 may each have a first surface 196 and a second surface 198. It is generally contemplated that the first surface 196 of each of the first and second engagement members 28, 30 is recessed relative to the second surface 198. The first and second engagement members 28, 30 illustrated in FIG. 16 are configured to engage the printed circuit board 64 via the respective second surfaces 198.

It is further contemplated that each of the first and second engagement members 28, 30 may have a generally circular or spherical configuration to further define the recessed first surface 196 and the second surface 198. In this configuration, the first engagement member 28 and the second engagement member 30 each centrally define an aperture 200. It is contemplated that the gap 194 defined between the first and second prongs 190, 192 illustrated in FIG. 15 and the aperture 200 illustrated in FIG. 16 are each configured to minimize potential build-up of food particles that may enter the mechanical compartment 56. The gap 194 and/or the aperture 200 may assist in removing potential food particles relative to minimize potential build-up on each of the first and second engagement members 28, 30.

With further reference to FIGS. 11-16, it is generally contemplated that the controller 62 includes the printed circuit board 64, and the first and second engagement members 28, 30 are communicatively and operably coupled to the printed circuit board 64 of the controller 62. The printed circuit board 64 is configured to translate inputs received from the actuator 26 via the first and second engagement features 28, 30 to execute an operation of the countertop appliance 10. For example, the first and second engagement features 28, 30 may be translated along the printed circuit board 64 via translation of the actuator 26 via the knob 34 of the slider 32. The translation of the actuator 26 along the printed circuit board 64 may correspond with an alteration of a speed function of the countertop appliance 10.

For example, the engagement of various portions of the printed circuit board 64 via the first and second engagement features 28, 30 may correspond to varying speeds of the countertop appliance 10 as set forth in an algorithm of the controller 62. The controller 62 may receive the inputs from the printed circuit board 64 as a result of the communication with the first and second engagement features 28, 30, and the controller 62 may alter the speed or other function of the countertop appliance 10. The engagement of the protuberance 182 of the actuator 26 with the detents 24 defined by the actuation feature 22 provide tactile feedback for the user during translation of the knob 34. The knob 34 translates the first and second engagement features 28, 30 along the printed circuit board 64 via the actuator 26, and the user can detect the adjustment via the engagement between the protuberance 182 and the detents 24.

Referring again to FIGS. 1-16, the adjustment assembly 20 of the countertop appliance 10 is configured to minimize the potential access and build-up of food particles within the mechanical compartment 56 of the countertop appliance 10. The barrier member 36 cooperates with the slider 32 and the bracket 90 to block and generally obstruct the slot 18 defined by the mixer head 16 and the opening 94 defined by the bracket 90. The engagement of the barrier member 36 with the retention features 104 of the bracket 90 assist in maintaining the position of the barrier member 36 relative to the opening 94 defined by the bracket 90. Further, the barrier member 36 being operably coupled within the groove 126 defined by the slider 32 and the selective engagement with the notch 128 defined within the groove 126 via the projection 150 of the barrier member 36 assists in proper alignment and cooperative movement of both the slider 32 and the barrier member 36. This cooperative movement and translation of each of the slider 32 and the barrier member 36 further maintains the obstruction of the opening 94 in the first position 130 and in each of the plurality of second positions 132 of the slider 32 and the barrier member 36. In addition, the ledge 144 defined by the slider 32 further assists in minimizing access of food particles into the mechanical compartment 56 in particular relative to the actuation feature 22.

It is also contemplated that the uniform detents 24 defined along the length $L_2$ of the actuation feature 22 assists the user in detecting the varying speed selections of the countertop appliance 10 by easily manipulating and translating the knob 34, such that the protuberance 182 of the actuator 26 may engage each detent 24 with minimal disruption. The uniform shapes and size of the detents 24 minimizes the precise translation of the knob 34 that may be otherwise utilized to select a function of the countertop appliance 10 where the detents 24 are not uniform in size. The uniform size and configuration of the detents 24 maximizes the user proficiency and operation of the countertop appliance 10.

Referring still to FIGS. 1-16, the configuration of the first and second engagement features 28, 30 further maximizes the operation of the countertop appliance 10 by minimizing the potential for food particle build-up on either of the first and second engagement features 28, 30. For example, in either configuration, the first and second engagement features 28, 30 define either the gap 194 defined between the first and second prongs 190, 192 and/or the aperture 200 centrally defined on each of the first and second engagement features 28, 30. In either configuration, the minimal buildup of food particles assists and improves the overall communication and efficiency between the actuator 26 and the controller 62 via the printed circuit board 64.

The invention disclosed herein is further summarized in the following paragraphs and is further characterized by combinations of any and all of the various aspects described therein.

According to one aspect of the present disclosure, a countertop appliance includes a body that includes a pedestal. A mixer head is operably coupled to the body and defines a slot. An adjustment assembly is operably coupled to and selectively disposed within the mixer head. The adjustment assembly includes an actuation feature that defines detents and includes an actuator with a first engagement member and a second engagement member, and a slider includes a knob that extends outwardly from the slot defined by the mixer head. The knob is selectively coupled to the actuation feature. The adjustment assembly further includes a barrier member that is operably coupled to the slider proximate to the slot defined by the mixer head and the actuation feature.

According to another aspect, a first engagement member and a second engagement member of an actuator each include a first prong and a second prong.

According to another aspect, a countertop appliance further includes a controller that has a printed circuit board. A first prong and a second prong of a first engagement member and a second engagement member are communicatively and operably coupled to the printed circuit board.

According to another aspect, detents are uniformly defined along an actuation feature.

According to another aspect, a countertop appliance further includes a bracket that is operably coupled to an adjustment assembly and has at least one flange, wherein a mixer head includes at least one alignment feature that is disposed within the at least one flange of the bracket.

According to another aspect, a slider includes a body portion and a ledge that extends from the body portion proximate to an actuation feature.

According to another aspect, a slider defines a groove and a notch within the groove. A barrier member includes a spine that has a projection selectively coupled with the notch that is defined by the slider.

According to another aspect of the present disclosure, an adjustment assembly for a counter appliance includes a bracket that defines an opening and includes retention features defined proximate to the opening. A slider is operably coupled to the bracket and includes a knob that extends through the opening that is defined by the bracket. The slider defines a groove and a notch. A barrier member is operably coupled to the slider and is selectively coupled to the retention features of the bracket. The barrier member includes a spine that is slidably disposed within the groove defined by the slider and selectively engaged with the notch.

According to another aspect, a barrier member is operable between a first position and a second position, wherein the first position is defined by the barrier member that is disposed proximate an opening defined by a bracket.

According to another aspect, a barrier member includes retention tabs that are selectively coupled to retention features of a bracket in a first position of the barrier member.

According to another aspect, a barrier member defines a channel and a bracket that includes a protrusion. The protrusion of the bracket is disposed within the channel of the barrier member and engages an end of the channel in a second position of the barrier member.

According to another aspect, a barrier member includes a projection that extends from a spine and is selectively coupled to a notch that is defined by a slider.

According to another aspect, an adjustment assembly further includes an actuation feature that is operably coupled to a slider via a knob and defines uniform detents along a length of the actuation feature, and an actuator is disposed within the actuation feature and is operably coupled to the slider via the uniform detents of the actuation feature. The actuator includes a first engagement member and a second engagement member. The first engagement member and the second engagement member each define an aperture.

According to yet another aspect of the present disclosure, a mixer head for a countertop appliance includes a shell that defines a slot. A bracket includes flanges that are operably coupled to the shell proximate to the slot. A slider is operably coupled to the bracket and includes a knob that extends through the slot that is defined by the shell. The slider also includes a barrier member that is operably coupled to the bracket and the slider via a groove that is defined by a body portion of the slider. An actuation feature defines detents and includes an actuator. The actuator includes a first engagement member and a second engagement member. The slider is selectively coupled with at least one of the detents defined by the actuation feature to engage the actuator.

According to another aspect, a first engagement member and a second engagement member of an actuator each have a first surface and a second surface. The first surface is recessed relative the second surface.

According to another aspect, a first engagement member and a second engagement member each centrally define an aperture.

According to another aspect, a first engagement member and a second engagement member of an actuator each include a first prong and a second prong.

According to another aspect, a bracket defines an opening proximate a slot that is defined by a shell. A barrier member and a slider are both operable between a first position and a second position relative to the opening that is defined by the bracket.

According to another aspect, a bracket includes a protrusion and a barrier member of a slider that defines a channel. The protrusion of the bracket is operably coupled to an end of a channel in a second position of the barrier member and the slider.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A countertop appliance, comprising:
   a body including a pedestal;
   a mixer head operably coupled to the body and defining a slot; and
   an adjustment assembly operably coupled to and selectively disposed within the mixer head, the adjustment assembly including:
      an actuation feature defining detents and including an actuator with a first engagement member and a second engagement member, wherein the first engagement member and the second engagement member each include a central aperture;
      a slider including a knob extending outwardly from the slot defined by the mixer head, wherein the knob is selectively coupled to the actuation feature; and
      a barrier member operably coupled to the slider proximate to the slot defined by the mixer head and the actuation feature.

2. The countertop appliance of claim 1, wherein the first engagement member and the second engagement member of the actuator each include a first prong and a second prong.

3. The countertop appliance of claim 2, further comprising:

a controller having a printed circuit board, wherein the first prong and the second prong of each of the first engagement member and the second engagement member are communicatively and operably coupled to the printed circuit board.

4. The countertop appliance of claim 1, wherein the detents are uniformly defined along the actuation feature.

5. The countertop appliance of claim 1, further comprising:
a bracket operably coupled to the adjustment assembly and having at least one flange, wherein the mixer head includes at least one alignment feature disposed within the at least one flange of the bracket.

6. The countertop appliance of claim 5, wherein the barrier member is operable between a first position and a second position, and wherein the first position is defined by the barrier member being disposed proximate an opening defined by the bracket.

7. The countertop appliance of claim 6, wherein the barrier member includes retention tabs selectively coupled to retention features of the bracket.

8. The countertop appliance of claim 6, wherein the barrier member defines a channel and the bracket includes a protrusion, and wherein the protrusion of the bracket is disposed within the channel of the barrier member.

9. The countertop appliance of claim 5, further comprising:
hooks outwardly extending from an upper portion of the slider.

10. The countertop appliance of claim 9, wherein the hooks of the slider maintain alignment between the slider and the bracket as the slider translates along the bracket.

11. The countertop appliance of claim 1, wherein the slider includes a body portion and a ledge extending from the body portion proximate to the actuation feature.

12. The countertop appliance of claim 1, wherein the slider defines a groove and a notch within the groove, and wherein the barrier member includes a spine having a projection selectively coupled with the notch defined by the slider.

13. The countertop appliance of claim 12, wherein the barrier member includes a projection extending from the spine and selectively coupled to the notch defined by the slider.

14. The countertop appliance of claim 1, further comprising:
a removable housing in the form of a shell disposed above the adjustment assembly.

15. The countertop appliance of claim 1, wherein the actuator is operably coupled to the slider via the detents of the actuation feature, and wherein the first engagement member and the second engagement member each define an aperture.

16. A countertop appliance, comprising:
a mixer head; and
an adjustment assembly operably coupled to and selectively disposed within the mixer head, the adjustment assembly including:
an actuation feature defining detents and including an actuator;
a slider including a knob extending outwardly from a slot defined by the mixer head, wherein the knob is selectively coupled to the actuation feature, and wherein the slider defines a groove and a notch within the groove; and
a barrier member operably coupled to the slider proximate to the slot defined by the mixer head and the actuation feature, the barrier member including a spine having a projection selectively coupled with the notch defined by the slider.

17. The countertop appliance of claim 16, further comprising:
a bracket operably coupled to the adjustment assembly and having at least one flange, wherein the mixer head includes at least one alignment feature disposed within the at least one flange of the bracket.

18. The countertop appliance of claim 17, wherein the barrier member includes retention tabs selectively coupled to retention features of the bracket.

19. The countertop appliance of claim 17, further comprising:
hooks outwardly extending from an upper portion of the slider.

* * * * *